Patented Nov. 28, 1944

2,363,794

UNITED STATES PATENT OFFICE 2,363,794

PROTEIN COMPOSITIONS OF MATTER AND METHOD OF PREPARING SAME

Percy L. Julian, Maywood, Elmer B. Oberg, Evanston, and Bernard T. Malter, Chicago, Ill., assignors to The Glidden Company, Cleveland, Ohio, a corporation of Ohio No Drawing. Application April 8, 1939,
Serial No. 266,860

14 Claims. (Cl. 106—154)

The present invention relates to protein solutions and more particularly relates to protein solutions which are resistant to coagulation by formaldehyde or other aldehydes.

The use of formaldehyde for rendering protein insoluble is well known. However, difficulties due to coagulation of the protein are encountered if the formaldehyde is added to the protein solution. In order to overcome this difficulty in coating processes a two step process has been resorted to. This expedient, however, is cumbersome and cannot be employed in the case of protein paints, etc. since ordinarily facilities are not available for the application of the formaldehyde after application of the paint. The use of ammonia has been proposed to retard the action of the formaldehyde but the resulting odor prevents its use as a practical matter. For these reasons the use of formaldehyde as an insolubilizing agent for protein in coating and sizing compositions, inks, paints, etc. has not been general.

It has been found, however, that if a vegetable protein, such as soy bean protein, is hydrolyzed, that the coagulation or gelling of the protein in solution upon the addition of formaldehyde is retarded and may be substantially prevented. This phenomenon takes on particular significance since upon drying of the hydrolyzed protein-formaldehyde solution the protein is as waterproof as the unhydrolyzed protein formaldehyde product. It has been found that the more the protein has been hydrolyzed the greater is the retardation of the gelling. In fact, the formaldehyde reaction may be used as a barometer of the cleavage of the protein molecule and a measure of the hydrolysis.

Accordingly the degree of hydrolysis effected will ordinarily depend upon the particular manner in which the material is used. In the case of paint compositions, for example, where a high concentration of protein is desired a greater degree of hydrolysis will be employed. Or in cases where the solution does not have to stand long a lesser degree of hydrolysis may be resorted to, and still maintain high concentrations of protein and formaldehyde. It is possible, according to the present invention, to prepare a protein paint containing formaldehyde which will not gel in the can.

The hydrolysis may be effected by any of the usual methods, such as by means of acids, alkalis, proteolytic enzymes, etc. An enzyme hydrolysis or an enzyme hydrolysis following an alkaline hydrolysis has been found very satisfactory and a slight cleavage by either of these means allows the addition of large amounts of formaldehyde to comparatively concentrated protein solutions without gelling.

EXAMPLE I

In one example an isolated soy bean protein was hydrolyzed with sodium peroxide and 10, 11, and 12.5% solutions of this protein in water employing 3% NaOH by weight of the protein as a cutting agent were made, 40% formalin (37% HCHO) by weight of the protein was then added and the pipette viscosity measured at succeeding time intervals to determine the amount of gelling of the solution. Table I gives the results.

*Table I (40% Formalin by weight of protein)*

| Percent protein in solution | Pipette viscosity | | | | Effect |
|---|---|---|---|---|---|
| | Before HCHO added | 1 hr. after HCHO added | 20 hrs. after HCHO added | 45 hrs. after HCHO added | |
| 10 | 30.6 | 31.3 | 32.1 | 32.5 | Thin overnight (20 hrs.) |
| 11.1 | 32.0 | 32.5 | 37.5 | 39.2 | Do. |
| 12.5 | 34.3 | 40.0 | Gel | Gel | Gel overnight (20 hrs.) |

While the 12.5% solution gelled overnight it remained thin and in a workable condition for several hours before gelling. The 40% formaldehyde, however, is in excess of that which frequently is necessary in practice to produce insolubility and the protein described may be used with formaldehyde for many purposes.

EXAMPLE II

In this example the hydrolyzed protein of Example I was given an additional hydrolysis with a proteolytic enzyme. The enzyme used was a proteolytic fungus enzyme having an EE value of 3500 based on casein at pH 8.2 to 8.5. A 15–16% solution (1:6.5 dilution ratio) was prepared employing 15% of borax by weight of the protein and the solution containing the enzyme was held at 115° F. for 2 hours. The solution was then divided and various percentages of formalin added to the separate portions. The viscosities of the various portions at succeeding time intervals was measured and the gelling tendency noted. Table II shows the results.

*Table II (1:6.5 dilution ratio)*

| Per cent formalin by weight (of protein) | Pipette viscosity | | | | Effect after 20 hours |
|---|---|---|---|---|---|
| | Before HCHO added | 1 hr. after HCHO added | 20 hrs. after HCHO added | 45 hrs. after HCHO added | |
| 10 | 32.3 | 33.8 | 33.6 | 33.2 | Thin body. |
| 20 | 32.3 | 33.8 | 35.4 | 36.0 | Do. |
| 30 | 32.3 | 34.5 | 37.0 | 39.0 | Do. |
| 40 | 32.3 | 34.4 | 38.0 | 40.1 | Do. |

It is seen from Table II that even though the concentration of protein is nearly 16% and 40% formalin is added the solution remains thin overnight and with little further change after an additional 24 hours. The slight decrease in viscosity of the 10% solution is explained by the fact that the amount of formalin added was not sufficient to completely stop the enzyme action.

Protein hydrolyzed with an enzyme such as in Example II has been found particularly suitable for use in the manufacture of paints and paint clears. It is possible by this invention to prepare a solution having a high percentage of protein in solution (up to at least 15–16%), and still incorporate sufficient formaldehyde for reaction with the protein to produce a waterproof film when dry, but which solutions will not gel within the time necessary for proper application of the paint. The protein solutions contemplated by the present invention are also admirably suited for sizing compositions for paper, fabrics, etc., for coating and waterproofing paper, fabrics, etc., for coating compositions in general, and for other purposes involving the protein-formaldehyde reaction, particularly where it is desired to retard the gelling of the protein.

It is not necessary that an isolated soy bean protein be hydrolyzed, as the flour may be treated and still obtain the advantages of the present invention. Milk casein, however, has not been found to show the advantages of the present invention. In place of formaldehyde, other aldehydes which commonly react with protein, such as acetaldehyde, furfural, etc. may be used.

Having described the invention, what is desired to secure by Letters Patent of the United States is:

1. A protein composition of matter resistant to gelling comprising water, hydrolyzed soy bean protein in solution and formaldehyde, the concentration of protein being from 10 to 16% by weight of the water, and the formaldehyde, calculated as formalin, being from about 10% to 40% by weight of the protein.

2. A coating composition resistant to gelling comprising water, alkali, hydrolyzed vegetable protein in solution and formaldehyde, the amount of hydrolyzed protein in solution being from 10 to 16% by weight of the water, and the amount of formaldehyde, calculated as formalin, being from about 10% to 40% by weight of the protein.

3. The process of producing a protein-formaldehyde solution resistant to gelling which comprises hydrolyzing a vegetable protein, forming an aqueous liquid solution of the hydrolyzed protein containing from 10 to 16% protein by weight of the water, and incorporating formaldehyde in the solution in an amount from about 10% to 40% calculated as formalin, by weight of the protein.

4. The process of producing a protein-formaldehyde solution resistant to gelling which comprises hydrolyzing a soy-bean protein, forming an aqueous liquid solution of the hydrolyzed protein containing from 10 to 16% protein by weight of the water, and incorporating formaldehyde in the solution in an amount from about 10% to 40% calculated as formalin, by weight of the protein.

5. The process of producing a relatively concentrated liquid protein solution containing formaldehyde and which is resistant to gelling, which comprises hydrolyzing a soy bean protein with enzyme, forming an aqueous solution containing 10 to 16% of said hydrolyzed protein by weight of water and incorporating formaldehyde in amounts from about 10% to 40%, calculated as formalin, by weight of the protein.

6. A liquid protein composition of matter comprising an aqueous solution of an hydrolyzed vegetable protein in an amount from 10 to 16% by weight of the water present, said solution containing an aldehyde which commonly reacts with protein, in amount equivalent to from about 10% to 40% by weight of the protein said solution being characterized by its retarded gelling.

7. A liquid protein composition of matter comprising an aqueous solution of an hydrolyzed soy bean protein in an amount from 10 to 16% by weight of the water present, said composition containing an aldehyde which commonly reacts with protein, in amount equivalent to from about 10% to 40% by weight of the protein said solution being characterized by its retarded gelling.

8. A liquid protein composition of matter comprising an aqueous solution of an hydrolyzed soy bean protein in an amount from 10 to 16% by weight of the water present, said solution containing an aldehyde selected from the class consisting of formaldehyde, acetaldehyde and furfural in an amount equivalent to from about 10% to 40% of formalin by weight of the protein, said solution being characterized by its retarded gelling.

9. The process by producing a protein-formaldehyde solution characterized by its retarded gelling which comprises hydrolyzing a vegetable protein, forming an aqueous liquid solution of the hydrolyzed protein in amounts from 10 to 16% by weight of the water employed, and incorporating in said solution an aldehyde which commonly reacts with protein in an amount equivalent to from about 10% to 40% of formalin by weight of the protein.

10. The process of producing a protein-formaldehyde solution characterized by its retarded gelling which comprises hydrolyzing a soy bean protein, forming an aqueous liquid solution of said hydrolyzed protein in amounts from 10 to 16% by weight of the water employed and incorporating in said solution an aldehyde which commonly reacts with protein in an amount equivalent to from about 10% to 40% of formalin by weight of the protein.

11. The process of producing a protein-formaldehyde solution characterized by retarded gelling which comprises hydrolyzing a soy bean protein, forming an aqueous liquid solution of said hydrolyzed protein in amounts from 10 to 16% by weight of the water employed, and incorporating an aldehyde selected from the class consisting of formaldehyde, acetaldehyde and furfural in an amount equivalent to from about 10% to 40% of formalin by weight of the protein, in said solution.

12. The process of producing a protein-formaldehyde solution characterized by its retarded gelling, which comprises first subjecting soy bean protein to an alkaline hydrolysis then subjecting the protein to an enzyme hydrolysis, forming an aqueous liquid solution of the thus hydrolyzed protein, and incorporating an aldehyde in said solution capable of producing an insoluble protein-aldehyde reaction product when dry.

13. The method of producing a protein which will not be precipitated in aqueous solutions containing aldehydes which normally causes precipitation of the protein which comprises first subjecting soy bean protein to an alkaline hydrolysis, and thereafter to an enzyme hydrolysis.

14. A liquid protein composition of matter resistant to gelling comprising an aqueous solution of a hydrolyzed soybean protein, and an aldehyde capable of producing an insoluble protein-aldehyde reaction product when dry, said hydrolyzed soybean protein being that resulting from, first subjecting soybean protein to an alkaline hydrolysis, and then to an enzyme hydrolysis.

PERCY L. JULIAN.
ELMER B. OBERG.
BERNARD T. MALTER.